United States Patent
Helvick

(10) Patent No.: US 7,555,640 B2
(45) Date of Patent: Jun. 30, 2009

(54) MOBILE ELECTRONIC DEVICE WITH FRAGMENTED DEVICE SETTINGS

(75) Inventor: Richard Eric Helvick, Portland, OR (US)

(73) Assignee: Sharp Laboratories of America, Inc., Camas, WA (US)

(*) Notice: Subject to any disclaimer, the term of this patent is extended or adjusted under 35 U.S.C. 154(b) by 474 days.

(21) Appl. No.: 11/371,843

(22) Filed: Mar. 9, 2006

(65) Prior Publication Data

US 2007/0214344 A1   Sep. 13, 2007

(51) Int. Cl.
*G06F 9/00* (2006.01)

(52) U.S. Cl. .................. 713/1; 714/100; 717/122; 717/168

(58) Field of Classification Search .......... 713/1; 714/100; 717/122, 168
See application file for complete search history.

(56) References Cited

U.S. PATENT DOCUMENTS

| | | | |
|---|---|---|---|
| 6,622,017 B1 | 9/2003 | Hoffman | 455/419 |
| 6,751,795 B1 * | 6/2004 | Nakamura | 717/174 |
| 7,117,482 B2 * | 10/2006 | Nguyen et al. | 717/122 |
| 2002/0124243 A1 * | 9/2002 | Broeksteeg et al. | 717/168 |
| 2003/0135663 A1 * | 7/2003 | Duncan et al. | 709/321 |
| 2003/0204711 A1 * | 10/2003 | Guess | 713/1 |
| 2004/0018831 A1 | 1/2004 | Majmundar et al. | 455/419 |
| 2004/0218065 A1 * | 11/2004 | Schinner | 348/231.6 |
| 2005/0028165 A1 * | 2/2005 | McGowan et al. | 719/310 |
| 2005/0114685 A1 | 5/2005 | Blinick et al. | 713/191 |
| 2005/0120040 A1 | 6/2005 | Williams et al. | 707/102 |
| 2005/0149545 A1 * | 7/2005 | Zenz | 707/101 |
| 2005/0166199 A1 | 7/2005 | Willis | 717/173 |
| 2005/0172295 A1 | 8/2005 | Goring et al. | 719/310 |
| 2005/0190764 A1 | 9/2005 | Shell et al. | 370/389 |
| 2006/0041881 A1 * | 2/2006 | Adkasthala | 717/168 |
| 2006/0234632 A1 * | 10/2006 | Lin et al. | 455/41.2 |
| 2007/0022328 A1 * | 1/2007 | Tarra et al. | 714/100 |

FOREIGN PATENT DOCUMENTS

| | | |
|---|---|---|
| EP | 1515571 A2 | 3/2005 |
| EP | 1544739 A2 | 6/2005 |

* cited by examiner

*Primary Examiner*—Thomas Lee
*Assistant Examiner*—Vincent T Tran
(74) *Attorney, Agent, or Firm*—Scot A. Reader

(57) ABSTRACT

A mobile electronic device with fragmented device settings enables preservation of user-defined settings during over-air software updates. Such a device in one aspect comprises a memory adapted to store at least one device setting including a default setting determined independent of any user of the device and a user setting determinable by a user of the device; a wireless interface adapted to receive a software update; and a processor communicatively coupled to the wireless interface and the memory and adapted to update the default-setting in response to the software update.

15 Claims, 3 Drawing Sheets

MOBILE ELECTRONIC DEVICE WITH FRAGMENTED DEVICE SETTINGS

BACKGROUND OF THE INVENTION

The present invention relates to mobile electronic devices, and more particularly to mobile electronic devices capable of preserving user-defined settings during over-air updates of device settings.

Mobile electronic devices, such as notebook computers, cellular phones, personal data assistants (PDAs) and pocket PCs, are becoming increasingly sophisticated. This increased sophistication has brought with it more complex software and a higher incidence of coding errors, called software bugs. This increased sophistication has also led to more frequent availability of software upgrades that enhance the functionality of such devices. To remove software bugs and enable software upgrades, software updates are disseminated and applied on such devices.

To more efficiently disseminate software updates to a large installed base of mobile electronic devices, techniques that download software updates to such devices over-air have been deployed. In such wireless download schemes, a software update is typically loaded on a software update server in a network infrastructure and is pushed or pulled from the server to a plurality of such devices.

A technical challenge that arises during over-air software updates is how to update device settings without affecting user-defined settings. A software image on a mobile electronic device typically includes device settings that affect, for example, how the device interfaces with the user. These device settings are often initialized to default values that a user of the device can modify to match his or her preferences. Unfortunately, a conventional software update server has no knowledge of which device settings a user has modified. Without such knowledge, there is no way to perform a selective update of device settings via an over-air software update that preserves the user-defined settings. If device settings are globally updated as part of a software update, the user-defined settings are overwritten. The user must then once again modify the device settings to match his or her preferences, consuming the user's time and causing frustration. On the other hand, if device settings are not updated as part of a software update, the device may not perform at a desired level after the update. Old device settings that are no longer required will persist, new device settings that are required by the updated software will not become operative, and device setting default values will not be optimized for the updated software. Incompatibilities arising between the updated software and old device settings may even render the device inoperable.

SUMMARY OF THE INVENTION

The present invention, in a basic feature, enables user-defined settings to be preserved during an over-air update of device settings of a mobile electronic device. Generally speaking, preservation of user-defined settings is accomplished through fragmentation of device settings on the mobile electronic device into default settings and user settings that may be separately maintained, referenced and updated.

In one aspect, the present invention provides a mobile electronic device comprising a memory adapted to store at least one device setting including a default setting determined independent of any user of the device and a user setting determinable by a user of the device; a wireless interface adapted to receive a software update; and a processor communicatively coupled to the wireless interface and the memory and adapted to update the default setting in response to the software update. The software update may update the default setting to a valid or invalid value. The default setting may be maintained in a first file and the user setting may be maintained in a second file. In some embodiments, the memory is adapted to store a plurality of device settings each including a default setting determined independent of any user of the device and a user setting determinable by a user of the device wherein each default setting is updated in response to the software update.

In another aspect, the present invention provides a mobile electronic device comprising a memory adapted to store at least one device setting including a default setting determined independent of any user of the device and a user setting determinable by a user of the device; a user interface adapted to receive a user input; and a processor communicatively coupled to the user interface and the memory and adapted to update the user setting in response to the user input. The user input may update the user setting to a valid or invalid value. In some embodiments, the memory is adapted to store a plurality of device settings each including a default setting determined independent of any user of the device and a user setting determinable by a user of the device wherein one or all of the user settings are updated in response to the user input.

In another aspect, the present invention provides a mobile electronic device comprising a memory adapted to store at least one device setting including a default setting determined independent of any user of the device and a user setting determinable by a user of the device; and a processor communicatively coupled to the memory and adapted in response to interrogation of the device setting to select for application on the device one of the default setting and the user setting. In some embodiments, the processor selects the user setting for application on the device if the user setting is a valid and selects the default setting for application on the device if the user setting is invalid.

These and other aspects of the invention will be better understood by reference to the following detailed description taken in conjunction with the drawings that are briefly described below. Of course, the invention is defined by the appended claims.

DESCRIPTION OF THE PREFERRED EMBODIMENT

Figure 1:
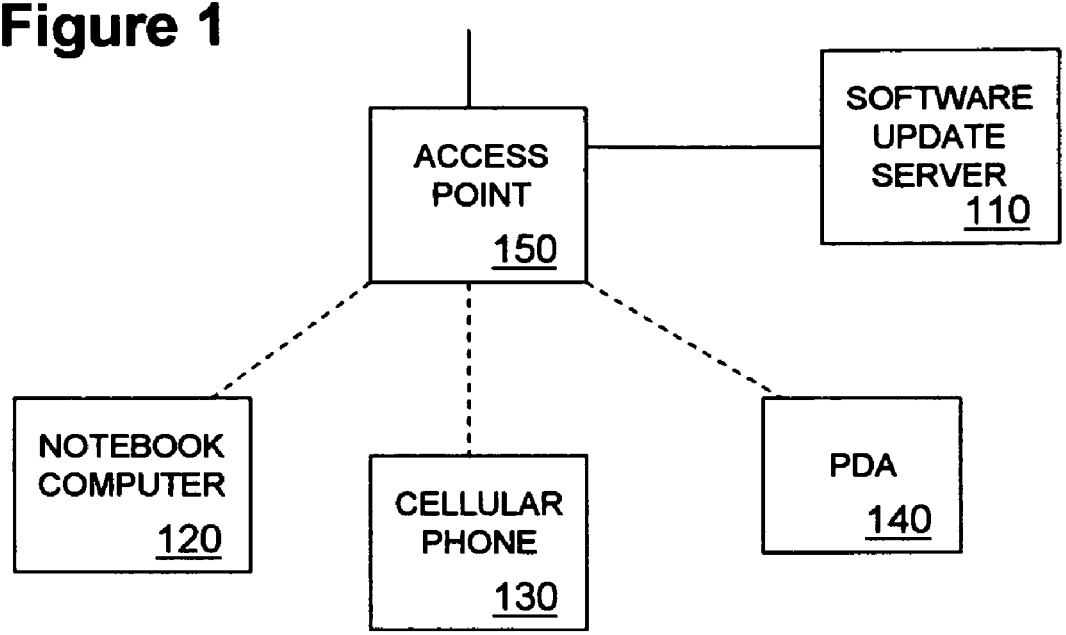
FIG. 1 is a system diagram of a network in accordance with an embodiment of the present invention.

In FIG. 1, a network in accordance with an embodiment of the present invention is shown. The network includes a software update server 110 in a network infrastructure. Server 110 may reside in an enterprise network or a service provider network, for example. Server 110 has wired connectivity with an access point 150, such as a cellular base station or a wireless LAN access point. The connectivity may be direct or via one or more intervening data communication nodes such as routers, switches and bridges. Access point 150 has wireless connectivity with a plurality of mobile electronic devices 120, 130, 140 via respective over-air links. Over-air links may include various types of links over which data may be transmitted, such as a cellular link or LAN link. Mobile electronic devices 120, 130, 140 shown include a notebook computer 120, a cellular phone 130 and a PDA 140, although other types of devices having a wireless interface, for example pocket PCs, may be deployed. In other embodiments, the mobile electronic devices in the network may be homogenous, that is, all may fit within the some product class (e.g. cell phones).

Software update server 110 stores and distributes software updates to an installed base of mobile electronic devices, such as devices 120, 130, 140. The installed base may include, for example, a group of mobile electronic devices owned by a common enterprise or used by a subscriber group. Software update types include, for example, patches with corrective code and upgrades with code that supports new features or functionality. Software updates also include device setting updates. In some embodiments, server 110 prepares and downloads to devices a delta package in lieu of a complete replacement software image. In such embodiments, server 110 compares a current version of software running on devices with a new version and creates a delta package reflective of differences. The delta package contains information sufficient to enable devices to self-update to the new version of software, such as a set of commands that instruct devices how to modify the current version. Devices receive the delta package from server 110 and execute the delta package to update to the new version. In some embodiments, software updates are pulled from server 110 pursuant to requests made by devices 120, 130, 140. In other embodiments, software updates are pushed by server 110 to devices 120, 130, 140 independent of any request.

Figure 2:
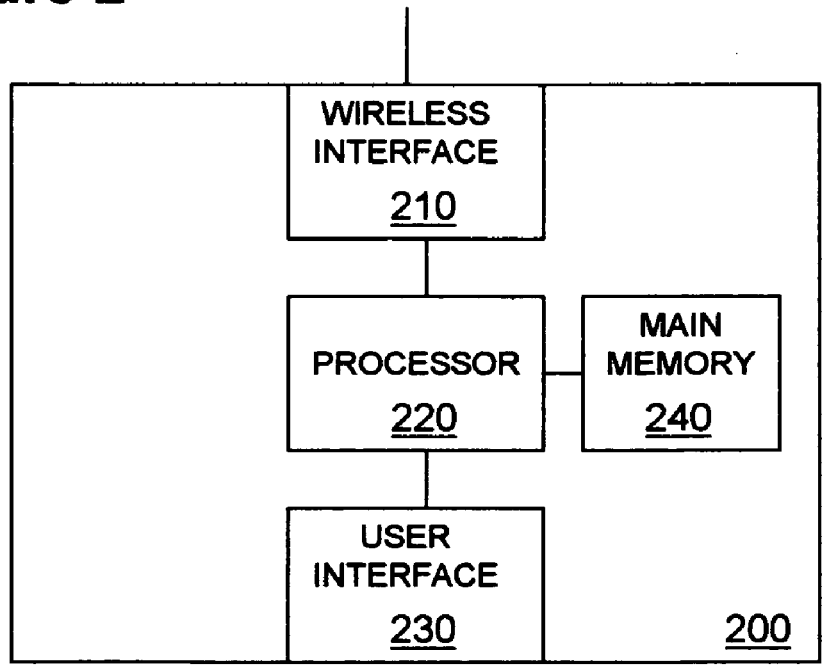
FIG. 2 is a block diagram of a mobile electronic device in accordance with an embodiment of the present invention.

Turning to FIG. 2, a representative mobile electronic device 200 in accordance with an embodiment of the present invention is shown. Device 200 includes a wireless interface 210 adopted to transmit and receive data in accordance with a wireless communication protocol, such as a cellular or wireless LAN protocol. Device 200 further includes a user interface 230 adapted to transmit outputs and receive inputs from a user of device 200. User interface 230 may, for example, include a display and a mechanism for user input such as a keypad or a touch-sensitive navigation tool. Device 200 further includes a main memory 240 adapted to store device software and settings. In some embodiments, memory 240 is a flash memory. Device 200 further includes a processor 220 adapted to execute device software stored in main memory 240 and interoperate with elements 210, 230, 240 to perform various features and functions supported by device 200.

Figure 3:
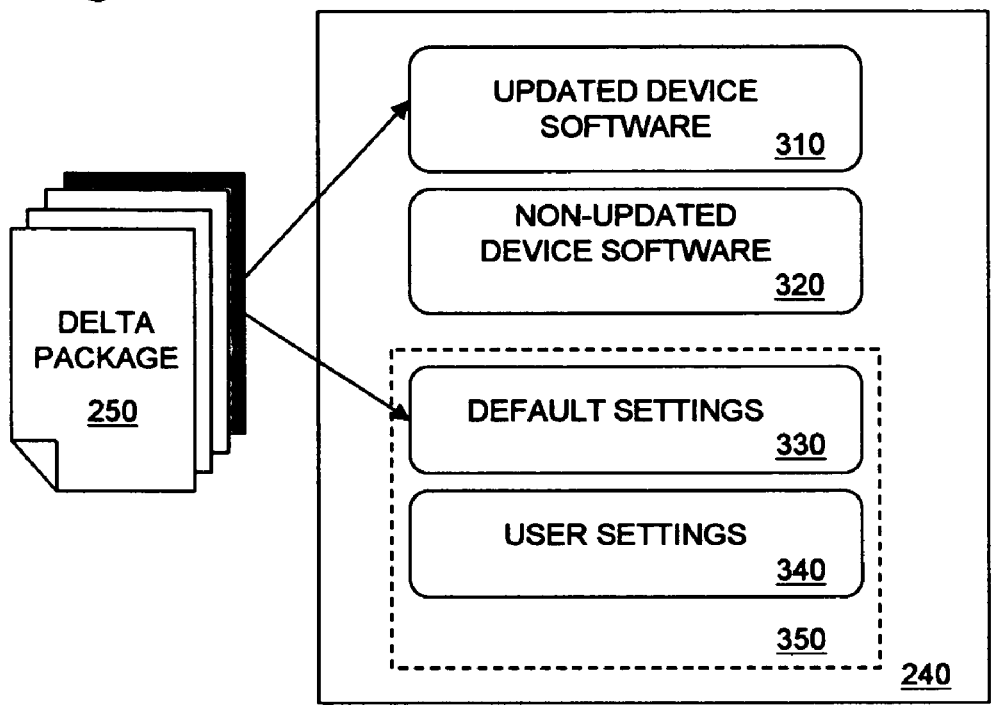
FIG. 3 is a block diagram showing updated and non-updated software elements within a mobile electronic device in accordance with an embodiment of the present invention.

Turning to FIG. 3, main memory 240 is shown in more detail to include device software 310, 320 and device settings 350. Device software 310, 320 includes software programs, such as an operating system, with instructions adapted for execution by processor 220 to perform various features and functions supported by device 200. Device software is logically partitioned into updated device software 310 and non-updated device software 320. Updated device software 310 includes program elements that are updated in response to a delta package 250 received from a software update server over wireless interface 210. Non-updated device software 320 includes program elements that are not updated in response to delta package 250. Device settings 350 include a multiple of settings that affect, for example, how device 200 interfaces with the user. Purely by way of example, different device settings may affect language presentation, text presentation, volume, ring tone and screen saver type.

Device settings 350 are logically partitioned into default settings 330 and user settings 340. Each device setting includes one default setting and one user setting. Default settings 330 are device settings that may be updated in response to software updates, such as delta package 250, but are not updated in response to user inputs. User settings 350 are device settings that may be updated in response to user inputs, but are not updated in response to software updates. In some embodiments, default settings 330 and user settings 340 are maintained in separate data tables and files.

Figure 4:
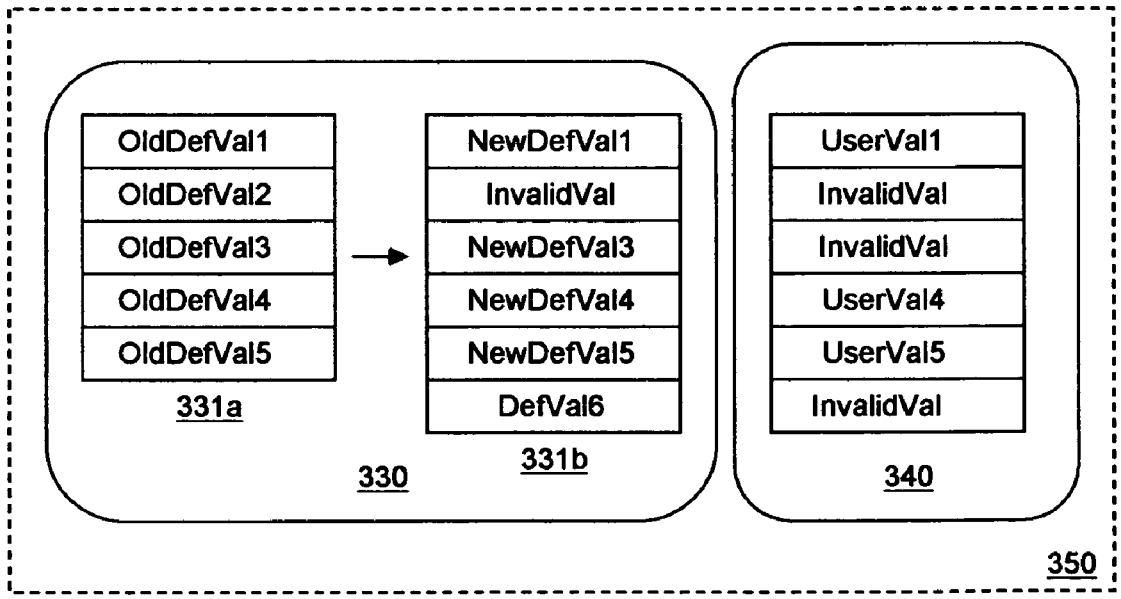
FIG. 4 is a block diagram showing updated and non-updated device settings within a mobile electronic device in accordance with an embodiment of the present invention.

Turning now to FIG. 4, device settings 350 are illustrated in greater detail by way of example. In the example shown, default settings 330 include five old default settings 331*a* and six new default settings 331*b* arranged in tabular format, with each setting having a reserved table location. Old default settings 331*a* include old default values OldDefVal1 through OldDefVal5. Application of delta package 250 converts old default settings 331*a* into new default settings 331*b* whereby old default values OldDefVal1 and OldDefVal3 through OldDefVal5 are replaced with new default values NewDefVal1 and NewDefVal3 through NewDefVal5. Additionally, application of delta package 250 results in replacement of old default value OldDefVal2 with invalid value InvalidVal. Finally, application of delta package 250 results in addition of a new default setting having a value of DefVal6 in a new table entry appended to the end of the table. Further in the example shown, user settings 340 include individual user settings arranged in tabular format and having reserved locations. The first, fourth and fifth user settings have valid values UserVal1, UserVal4 and UserVal5, respectively, while the remaining user settings are invalid.

Reservation of table locations for particular settings enables the formation of logical groups of settings from aligned settings in different tables. In particular, each aligned default setting and user setting together form a device setting. Thus, after application of delta package 250, the first device setting is defined by the tuple <NewDefVal1, UserVal1>, the second device setting is defined by the tuple <InvalidVal, InvalidVal>, the third device setting is defined by the tuple <NewDefVal3, InvalidVal>, and so on. Device settings whose default settings are invalid (that is, have invalid values) are inoperative, whereas device settings whose default settings are valid (that is, have valid values) are operative. Moreover, when the default setting and the user setting of a device setting are both valid, the user setting is preferred. That is, the user setting is returned in response to an interrogation of the device setting when the default setting and the user setting are both valid. It will be appreciated that preserving table entries for device settings rendered inoperative maintains the alignment between default settings and user settings required for formation of device settings. In other embodiments, table entries for inoperative device settings are removed and device software has a program that executes after software updates to restore alignment.

Figure 5:
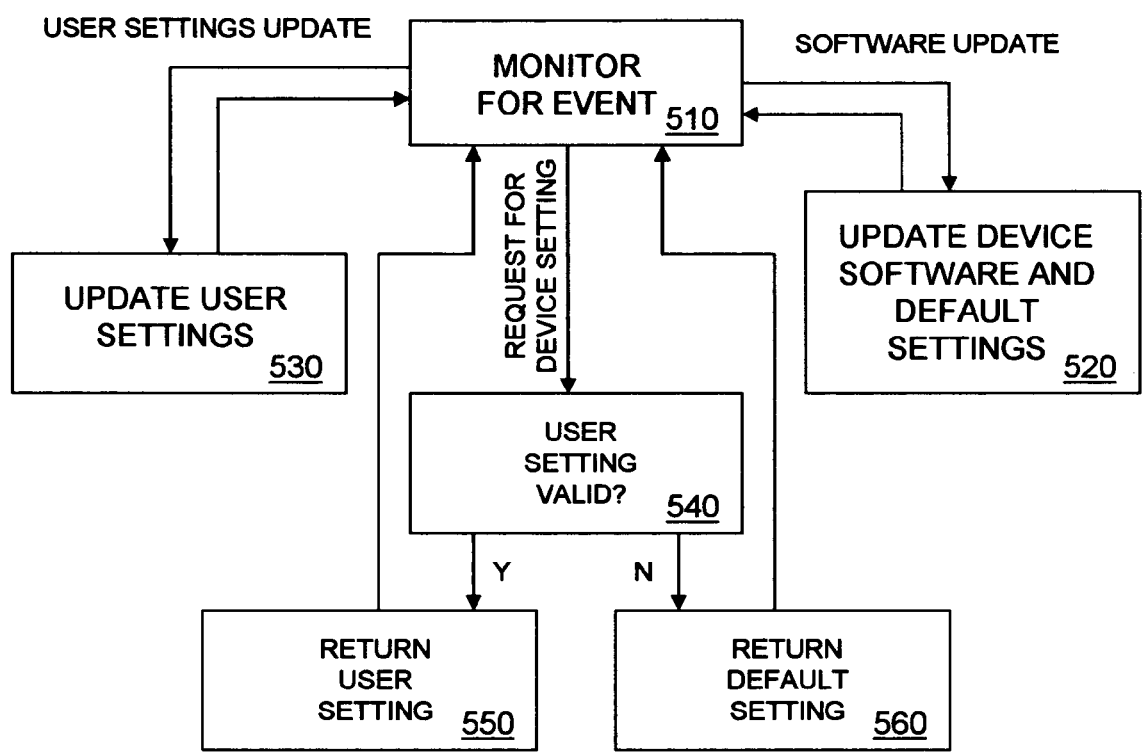
FIG. 5 is a flow diagram showing operation of a mobile electronic device in accordance with an embodiment of the present invention.

Referring now to FIG. 5, a flow diagram shows operation of mobile electronic device 200 in accordance with an embodiment of the present invention. Before the flow diagram begins, device 200 is booted and default settings 330 and user settings 340 initialize to their current values. Device 200 then monitors for an event (510). If the event is a software update, device software 310 and default settings 330 are updated (520). Software updates are prompted by receipt from a software update server over wireless interface 210 of a delta package including updated device software 310 and one or more valid or invalid update values for default settings. Current values for affected default settings are replaced with the update values. Any update values that pertain to new device settings are appended as a new table entry. Device 200 monitors for the next event (510) after completing the software update.

If the event is a user settings update, user settings are updated (530). User settings updates are prompted by input by a user on user interface 230 of one or more valid update values for user settings, or a reset instruction. Current values for affected user settings 340 are replaced with the valid update values. If a reset instruction is input, all current user settings 340 are reset to invalid. Device 200 monitors for the next event (510) after completing the user settings update.

Finally, if the event is a request for a device setting, the user setting for the device setting is interrogated and it is determined whether the user setting is valid (540). If the user setting is valid, the valid user setting is returned for application on device 200 (550). If the user setting is invalid (560), the default setting for the device setting is interrogated and returned for application on device 200 (560). Device 200 monitors for the next event (510) after processing the request for the device setting.

It will be appreciated by those of ordinary skill in the art that the invention can be embodied in other specific forms without departing from the spirit or essential character hereof. The present description is therefore considered in all respects to be illustrative and not restrictive. The scope of the invention is indicated by the appended claims, and all changes that come within the meaning and range of equivalents thereof are intended to be embraced therein.

What is claimed is:

1. A mobile electronic device, comprising:
    a memory adapted to store default settings determined independent of any user of the device aligned with respective user settings determinable by a user of the device;
    a wireless interface adapted to receive a software update; and
    a processor communicatively coupled with the wireless interface and the memory, wherein under control of the processor the device updates at least one of the default settings based on the software update whereby at least one of the default settings is rendered inoperative, and wherein alignment of all of the default settings with their respective user settings is maintained after the software update by preserving a table entry for the at least one default setting that is rendered inoperative.

2. The device of claim 1, wherein the default settings and respective user settings are stored in aligned table entries.

3. The device of claim 1, wherein the default settings are stored in a first file and the user settings are stored in a second file.

4. The device of claim 1, wherein the software update is received from a software update server.

5. The device of claim 1, wherein none of the user settings is updated based on the software update.

6. The device of claim 1, further comprising a user interface communicatively coupled with the processor and adapted to receive at least one user input, wherein under control of the processor the device is adapted to update at least one of the user settings in response to the at least one user input.

7. The device of claim 1, wherein the device is a telephone.

8. The device of claim 1, wherein the device settings and respective user settings affect at least one of language, text, volume, a ring tone or a screen saver.

9. The device of claim 1, wherein in response to interrogation of a device setting and under control of the processor the device is adapted to select for application on the device from among one of the default settings and a respective one of the user settings corresponding to the device setting.

10. The device of claim 9, wherein under control of the processor the device selects the respective one of the user settings for application on the device in response to determining that the respective one of the user settings is valid.

11. The device of claim 9, wherein under control of the processor the device selects the one of the default settings for application on the device in response to determining the respective one of the user settings is invalid.

12. A method for preserving user-defined settings, comprising the steps of:
    storing default settings determined independent of any user of a device aligned with respective user settings determinable by a user of the device;
    receiving a software update; and
    updating at least one of the default settings based on the software update whereby at least one of the default settings is rendered inoperative, wherein alignment of all of the default settings with their respective user settings is maintained after the software update by preserving a table entry for the at least one default setting that is rendered inoperative.

13. The method of claim 12, wherein the default settings and respective user settings are stored in aligned table entries.

14. The method of claim 12, further comprising the steps of:
    receiving at least one user input; and
    updating at least one of the user settings in response to the at least one user input.

15. The method of claim 12, further comprising the steps of:
    receiving an interrogation of a device setting; and
    selecting for application on the device from among one of the default settings and a respective one of the user settings corresponding to the device setting.

* * * * *